United States Patent
Ryoo et al.

(10) Patent No.: US 12,046,025 B2
(45) Date of Patent: Jul. 23, 2024

(54) CONNECTION WEIGHT LEARNING FOR GUIDED ARCHITECTURE EVOLUTION

(71) Applicant: Google LLC, Mountain View, CA (US)

(72) Inventors: Michael Sahngwon Ryoo, Mountain View, CA (US); Anthony Jacob Piergiovanni, Nazareth, PA (US); Mingxing Tan, Newark, CA (US); Anelia Angelova, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 373 days.

(21) Appl. No.: 17/605,783

(22) PCT Filed: May 22, 2020

(86) PCT No.: PCT/US2020/034267
§ 371 (c)(1),
(2) Date: Oct. 22, 2021

(87) PCT Pub. No.: WO2020/237168
PCT Pub. Date: Nov. 26, 2020

(65) Prior Publication Data
US 2022/0189154 A1   Jun. 16, 2022

Related U.S. Application Data

(60) Provisional application No. 62/852,217, filed on May 23, 2019.

(51) Int. Cl.
*G06V 10/82*     (2022.01)
*G06N 3/045*     (2023.01)
(Continued)

(52) U.S. Cl.
CPC ............ *G06V 10/82* (2022.01); *G06N 3/045* (2023.01); *G06T 1/20* (2013.01); *G06T 3/4046* (2013.01);
(Continued)

(58) Field of Classification Search
None
See application file for complete search history.

(56) References Cited

U.S. PATENT DOCUMENTS 10,931,702 B2 * 2/2021 DeFelice ................ G06N 3/044
10,984,245 B1 * 4/2021 Tran ..................... G06F 18/2111
(Continued)

OTHER PUBLICATIONS

Ahmed et al., "Connectivity learning in multi-branch networks," arXiv, Sep. 27, 2017, 14 pages.
(Continued)

*Primary Examiner* — Anand P Bhatnagar
(74) *Attorney, Agent, or Firm* — Fish & Richardson P.C.

(57) ABSTRACT

Methods, systems, and apparatus, including computer programs encoded on a computer storage medium, for determining one or more neural network architectures of a neural network for performing a video processing neural network task. In one aspect, a method comprises: at each of a plurality of iterations: selecting a parent neural network architecture from a set of neural network architectures; training a neural network having the parent neural network architecture to perform the video processing neural network task, comprising determining trained values of connection weight parameters of the parent neural network architecture; generating a new neural network architecture based at least in part on the trained values of the connection weight parameters of the parent neural network architecture; and adding the new neural network architecture to the set of neural network architectures.

20 Claims, 3 Drawing Sheets

VIDEO PROCESSING NEURAL NETWORK

(51) Int. Cl.
G06T 1/20 (2006.01)
G06T 3/4046 (2024.01)
G06T 7/207 (2017.01)
G06V 10/776 (2022.01)

(52) U.S. Cl.
CPC ............ *G06T 7/207* (2017.01); *G06V 10/776* (2022.01); *G06T 2207/10016* (2013.01); *G06T 2207/20081* (2013.01); *G06T 2207/20084* (2013.01)

(56) References Cited

U.S. PATENT DOCUMENTS

| | | | | |
|---|---|---|---|---|
| 11,615,302 | B2* | 3/2023 | Zhao | G06Q 30/0205 706/20 |
| 11,657,590 | B2* | 5/2023 | Gubbi Lakshminarasimha | G06N 3/08 382/190 |
| 11,790,213 | B2* | 10/2023 | Yao | G06N 3/045 706/20 |
| 2020/0286112 | A1* | 9/2020 | Zhou | G06N 3/084 |
| 2020/0394499 | A1* | 12/2020 | Yao | G06N 3/045 |
| 2022/0036523 | A1* | 2/2022 | Moran | G06T 5/70 |
| 2023/0114556 | A1* | 4/2023 | Ryoo | G06V 10/82 382/156 |
| 2023/0215006 | A1* | 7/2023 | Wang | G06T 7/0012 382/131 |
| 2023/0410650 | A1* | 12/2023 | Dantrey | G08G 1/096708 |

OTHER PUBLICATIONS

Ahmed et al., "Connectivity learning in multi-branch networks," Presented at Workshop on Meta-Learning, Long Beach, CA, Dec. 9, 2017, 5 pages.
Bender et al., "Understanding and simplifying one-shot architecture search," Presented at International Conference on Machine Learning, Stockholm, Sweden, Jul. 10-15, 2018, 11 pages.
Carreira et al., "Quo vadis, action recognition? a new model and the kinetics dataset," Proceedings of the IEEE Conference on Computer Vision and Pattern Recognition (CVPR), Jul. 2017, pp. 6299-6308.
Chen et al., "Deeplab: Semantic image segmentation with deep convolutional nets, atrous convolution, and fully connected CRFs," arXiv, May 12, 2017, 14 pages.
Diba et al., "Holistic large scale video understanding," arXiv, Apr. 25, 2019, 10 pages.
Feichtenhofer et al., "Convolutional two-stream network fusion for video action recognition," Proceedings of the IEEE Conference on Computer Vision and Pattern Recognition (CVPR), Jun. 2016, pp. 1933-1941.
Feichtenhofer et al., "Slowfast networks for video recognition," arXiv, Dec. 10, 2018, 11 pages.
Feichtenhofer et al., "Spatiotemporal multiplier networks for video action recognition," Proceedings of the IEEE Conference on Computer Vision and Pattern Recognition (CVPR), Jul. 2017, pp. 4768-4777.
Feichtenhofer et al., "Spatiotemporal residual networks for video action recognition," Advances in Neural Information Processing Systems 29, Dec. 2016, 9 pages.
Goldberg et al., "A comparative analysis of selection schemes used in genetic algorithms," Foundations of Genetic Algorithms, Jul. 1, 1991, pp. 69-93.
He et al., "Deep residual learning for image recognition," Proceedings of the IEEE Conference on Computer Vision and Pattern Recognition (CVPR), Jun. 2016, pp. 770-778.
International Preliminary Report on Patentability in International Appln. No. PCT/US2020/034267, dated Dec. 2, 2021, 13 pages.
International Search Report and Written Opinion in International Appln. No. PCT/US2020/034267, dated Sep. 8, 2020, 14 pages.
Ioffe et al., "Batch normalization: Accelerating deep network training by reducing internal covariate shift," Presented in International Conference on Machine Learning, Lille, France, Jul. 6-11, 2015, 9 pages.
Lea et al., "Temporal convolutional networks for action segmentation and detection," Proceedings of the IEEE Conference on Computer Vision and Pattern Recognition (CVPR), Jul. 2017, pp. 156-165.
Liu et al., "Auto-DeepLab: Hierarchical neural architecture search for semantic image segmentation," Proceedings of the IEEE/CVF Conference on Computer Vision and Pattern Recognition (CVPR), Apr. 6, 2019, pp. 82-92.
Liu et al., "DARTS: Differentiable architecture search," Presented at International Conference on Learning Representations, New Orleans, LA, May 6-9, 2019, 13 pages.
Liu et al., "Progressive neural architecture search," Proceedings of European Conference on Computer Vision, Sep. 2018, 16 pages.
Monfort et al., "Moments in time dataset: one million videos for event understanding," arXiv, Dec. 27, 2018, 8 pages.
Piergiovanni et al., "Evolving Space-Time Neural Architectures for Videos," arXiv, Nov. 26, 2018, 16 pages.
Piergovanni et al., "Representation flow for action recognition," Proceedings of the IEEE Conference on Computer Vision and Pattern Recognition (CVPR), Jun. 2019, pp. 9945-9953.
Real et al., "Regularized evolution for image classifier architecture search," Proceedings of AAAI Conference on Artificial Intelligence, Jul. 17, 2019, 33(1):4780-4789.
Ryoo et al., "AssembleNet: Searching for multi-stream neural connectivity in video architectures," arXiv, May 30, 2019, 13 pages.
Sigurdsson et al., "Hollywood in homes: Crowdsourcing data collection for activity understanding," Proceedings of European Conference on Computer Vision, Oct. 2016, pp. 510-526.
Sigurdsson et al., "Asynchronous temporal fields for action recognition," Proceedings of the IEEE Conference on Computer Vision and Pattern Recognition (CVPR), Jul. 2017, pp. 585-594.
Sigurdsson et al., "Charades-ego: A large-scale dataset of paired third and first person videos," arXiv, Apr. 30, 2018, 3 pages.
Simonyan et al., "Two-stream convolutional networks for action recognition in videos," Advances in Neural Information Processing Systems 27, Dec. 2014, 9 pages.
Suganuma et al., "A genetic programming approach to designing convolutional neural network architectures," Proceedings of the Genetic and Evolutionary Computation Conference, Jul. 2017, pp. 497-504.
Szegedy et al., "Rethinking the inception architecture for computer vision," Proceedings of the IEEE Conference on Computer Vision and Pattern Recognition (CVPR), Jun. 2016, pp. 2818-2826.
Tran et al., "A closer look at spatiotemporal convolutions for action recognition," Proceedings of the IEEE Conference on Computer Vision and Pattern Recognition (CVPR), Jun. 2018, pp. 6450-6459.
Tran et al., "C3D: Generic features for video analysis," arXiv, Dec. 2, 2014, 10 pages.
Wang et al., "Non-local neural networks," Proceedings of the IEEE Conference on Computer Vision and Pattern Recognition (CVPR), Jun. 2018, pp. 7794-7803.
Wang et al., "Temporal segment networks: Towards good practices for deep action recognition," Proceedings of European Conference on Computer Vision (ECCV), Oct. 2016, pp. 20-36.
Wang et al., "Videos as space-time region graphs," Proceedings of European Conference on Computer Vision (ECCV), Sep. 2018, 19 pages.
Wu et al., "Compressed video action recognition," Proceedings of the IEEE Conference on Computer Vision and Pattern Recognition (CVPR), Jun. 2018, pp. 6026-6035.
Wu et al., "Long-term feature banks for detailed video understanding," arXiv, Dec. 12, 2018, 12 pages.
Xie et al., "Exploring Randomly Wired Neural Networks for Image Recognition," arXiv, Apr. 8, 2019, 10 pages.
Xie et al., "Rethinking spatiotemporal feature learning: Speed-accuracy trade-offs in video classification," Proceedings of European Conference on Computer Vision (ECCV), Sep. 2018, 17 pages.
Yu et al., "Multi-scale context aggregation by dilated convolutions," Presented at International Conference on Learning Representations, San Juan, Puerto Rico, May 2-4, 2016, 13 pages.

(56) References Cited

OTHER PUBLICATIONS

Zach et al., "A duality based approach for realtime TV-L1 optical flow," Joint Pattern Recognition Symposium, Sep. 2007, pp. 214-223.
Zhou et al., "Temporal relational reasoning in videos," Proceedings of European Conference on Computer Vision (ECCV), Sep. 2018, 16 pages.
Zoph et al., "Learning transferable architectures for scalable image recognition," Proceedings of the IEEE Conference on Computer Vision and Pattern Recognition (CVPR), Jun. 2018, pp. 8697-8710.
Zoph et al., "Neural architecture search with reinforcement learning," Presented at International Conference on Learning Representations (ICLR), Toulon, France, Apr. 24-26, 2017, 16 pages.

* cited by examiner

CONNECTION WEIGHT LEARNING FOR GUIDED ARCHITECTURE EVOLUTION

CROSS-REFERENCE TO RELATED APPLICATION

This application is a National Stage Application under 35 U.S.C. § 371 and claims the benefit of International Application No. PCT/US2020/034267, filed May 22, 2020, which claims the benefit of U.S. Application No. 62/852,217, filed May 23, 2019. The disclosure of the foregoing application is hereby incorporated by reference in its entirety.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations for determining a neural network architecture for performing a machine learning task.

According to a first aspect there is provided a method performed by one or more data processing apparatus for determining a neural network architecture of a neural network for performing a video processing neural network task, the method comprising: maintaining data defining a set of neural network architectures, wherein for each neural network architecture: the neural network architecture comprises a plurality of blocks, wherein each block is a space-time convolutional block comprising one or more neural network layers that is configured to process a block input to generate a block output; and for each of one or more given blocks: (i) the block input for the given block comprises a block output from each of a plurality of other blocks, (ii) the given block has a respective connection weight parameter corresponding to each of the plurality of other blocks, and (iii) processing the block input comprises combining the other block outputs using the connection weight parameters corresponding to the other blocks; at each of a plurality of iterations: selecting a parent neural network architecture from the set of neural network architectures; training a neural network having the parent neural network architecture to perform the video processing neural network task, comprising determining trained values of the connection weight parameters of the parent neural network architecture; generating a new neural network architecture based at least in part on the trained values of the connection weight parameters of the parent neural network architecture; and adding the new neural network architecture to the set of neural network architectures; and after a final iteration of the plurality of iterations, selecting a final neural network architecture from the set of neural network architectures based on a performance metric for the final neural network architecture on the video processing neural network task.

In some implementations, each neural network architecture is configured to process an input comprising (i) a plurality of video frames, and/or (ii) a plurality of optical flow frames corresponding to the plurality of video frames.

In some implementations, each block processes a block input at a respective temporal resolution to generate a block output having a respective number of channels.

In some implementations, each block comprises one or more dilated temporal convolutional layers having a temporal dilation rate corresponding to the temporal resolution of the block.

In some implementations, each neural network architecture comprises blocks having different temporal resolutions.

In some implementations, each block comprises one or more residual modules.

In some implementations, combining the other block outputs using the connection weight parameters corresponding to the other blocks comprises: for each other block output, scaling the other block output by the connection weight parameter corresponding to the other block; and generating a combined input by summing the scaled other block outputs.

In some implementations, processing the block input further comprises processing the combined input in accordance with a plurality of block parameters to generate the block output.

In some implementations, generating a new neural network architecture based at least in part on the trained values of the connection weight parameters of the parent neural network architecture comprises determining which blocks in the new neural network architecture should receive block outputs from which other blocks in the new neural network architecture based at least in part on the trained values of the connection weight parameters of the parent neural network architecture.

In some implementations, determining which blocks in the new neural network architecture should receive block outputs from which other blocks in the new neural network architecture based at least in part on the trained values of the connection weight parameters of the parent neural network architecture comprises determining, for each given block in the parent neural network architecture that (i) receives a block output from an other block and (ii) has a connection weight parameter corresponding to the other block having a trained value that exceeds a threshold, that a block in the new neural network architecture corresponding to the given block should receive a block output from a block in the new neural network architecture corresponding to the other block.

In some implementations, the threshold is a predetermined threshold.

In some implementations, the threshold is sampled in accordance with a predetermined probability distribution.

In some implementations, the method further comprises for each of one or more pairs of blocks in the new neural network architecture comprising a first block and a second block, randomly determining whether the second block should receive a block output from the first block.

In some implementations, wherein generating the new neural network architecture comprises for each of one or more blocks in the new neural network architecture that correspond to respective blocks in the parent neural network architecture, applying one or more mutation operations to the block, wherein the mutation operations comprise: splitting the block, merging the block with a different block, and adjusting a temporal resolution of the block.

In some implementations, selecting a parent neural network architecture from the set of neural network architectures comprises: determining, for each of a plurality of particular neural network architectures from the set of neural network architectures, a performance metric of a neural network having the particular neural network architecture that is trained to perform the video processing neural network task; and selecting the parent neural network architecture from among the plurality of particular neural network architectures based on the performance metrics.

In some implementations, selecting the parent neural network architecture from among the plurality of particular neural network architectures based on the performance metrics comprises selecting the parent neural network architecture as the particular neural network architecture having the highest performance metric on the video processing neural network task.

In some implementations, the method further comprises removing the particular neural network architecture having the lowest performance measure on the video processing neural network task from the set of neural network architectures.

In some implementations, selecting the final neural network architecture from the set of neural network architectures comprises: determining, for each neural network architecture from the set of neural network architectures, a performance metric of a neural network having the neural network architecture that is trained to perform the video processing neural network task; and selecting the final neural network architecture as the neural network architecture having the highest performance metric on the video processing neural network task.

In some implementations, the method further comprises providing a neural network that (i) has the final neural network architecture and (ii) has been trained to perform the video processing neural network task.

In some implementations, for each neural network architecture: each block in the neural network architecture is associated with a respective level in a sequence of levels; and for each given block that is associated with a given level that follows the first level in the sequence of levels, the given block only receives block outputs from other blocks that are associated with levels that precede the given level.

According to another aspect, there is provided a system comprising one or more computers and one or more storage devices storing instructions that when executed by the one or more computers cause the one or more computers to perform the operations of the previously described method.

According to another aspect, there are provided one or more computer storage media (e.g., non-transitory computer storage media) storing instructions that when executed by one or more computers cause the one or more computers to perform the operations of the previously described method.

Particular embodiments of the subject matter described in this specification can be implemented so as to realize one or more of the following advantages.

The system described in this specification can automatically select a neural network architecture that may enable a neural network having the architecture to effectively perform a machine learning task, e.g., a video processing task. The system may select the architecture from a space of possible architectures that each include multiple blocks of neural network layers (e.g., space-time convolutional layers) that process block inputs which may be derived from different input streams (e.g., video frame streams or optical flow streams) at respective temporal resolutions. As part of selecting the architecture, the system selects how the blocks in the architecture connect to one another, i.e., which blocks receive inputs from which other blocks, and can thereby control how data flows through the architecture, and when and where features encoding different information at various levels of abstraction are combined. In contrast, some conventional architecture selection systems select an architecture from a less flexible space of possible architectures, e.g., a space where each architecture includes the same module of neural network layers sequentially repeated multiple times. By searching a complex and flexible space of possible architectures, the system described in this specification may select an architecture that enables a neural network having the architecture to perform machine learning tasks more effectively, e.g., with a higher prediction accuracy.

To select the architecture, the system evolves (i.e., updates) a population (i.e., set) of neural network architectures over multiple evolutionary iterations. At each evolutionary iteration, the system can generate a new neural network architecture from an existing, "parent" neural network architecture based on trained values of connection weight parameters that define the strength of connections between blocks in the parent neural network architecture. For example, the system can determine that strongly connected blocks in the parent architecture should still be connected in the new architecture, while connections between other blocks may be randomly re-configured in the new architecture. Guiding the evolution of the population of neural network architectures based on trained values of connection weight parameters may enable the system to select an architecture that achieves an acceptable performance on a machine learning task over fewer evolutionary iterations, thereby reducing consumption of computational resources, e.g., memory and computing power.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an architecture selection system 200 for selecting an architecture for a neural network that is configured to perform a machine learning task.

The machine learning task may be a video processing task, i.e., where the neural network processes a video (or features derived from the video) to generate an output that characterizes the video. A "video" may refer to a sequence of video frames, where each video frame may be represented as an array of numerical values and corresponds to a respective time point. For example, a video frame may be represented as an array of RBG or CIELAB values.

The input to the neural network may include, e.g., a sequence of video frames, a sequence of optical flow frames corresponding to the video frames, or both. Each optical flow frame may characterize the motion between a respective pair of video frames, i.e., between a first video frame and a subsequent video frame. For example, each optical flow frame may specify a respective displacement vector corresponding to each pixel in a first video frame, where the displacement vector estimates a displacement of the pixel between the first video frame and a subsequent video frame. The optical flow frames may be derived from the video frames using any of a variety of techniques, e.g., the Lucas-Kanade method.

The neural network may generate any of a variety of outputs that characterize an input video. For example, the neural network may generate a classification output that includes a respective score for each of multiple classes, where the score for a class defines a likelihood that the video is included in the class. In a particular example, the neural network may generate a classification output that classifies an action being performed by a person depicted in the video, and the classification output may specify a respective score for each action in a set of possible actions.

Figure 1:
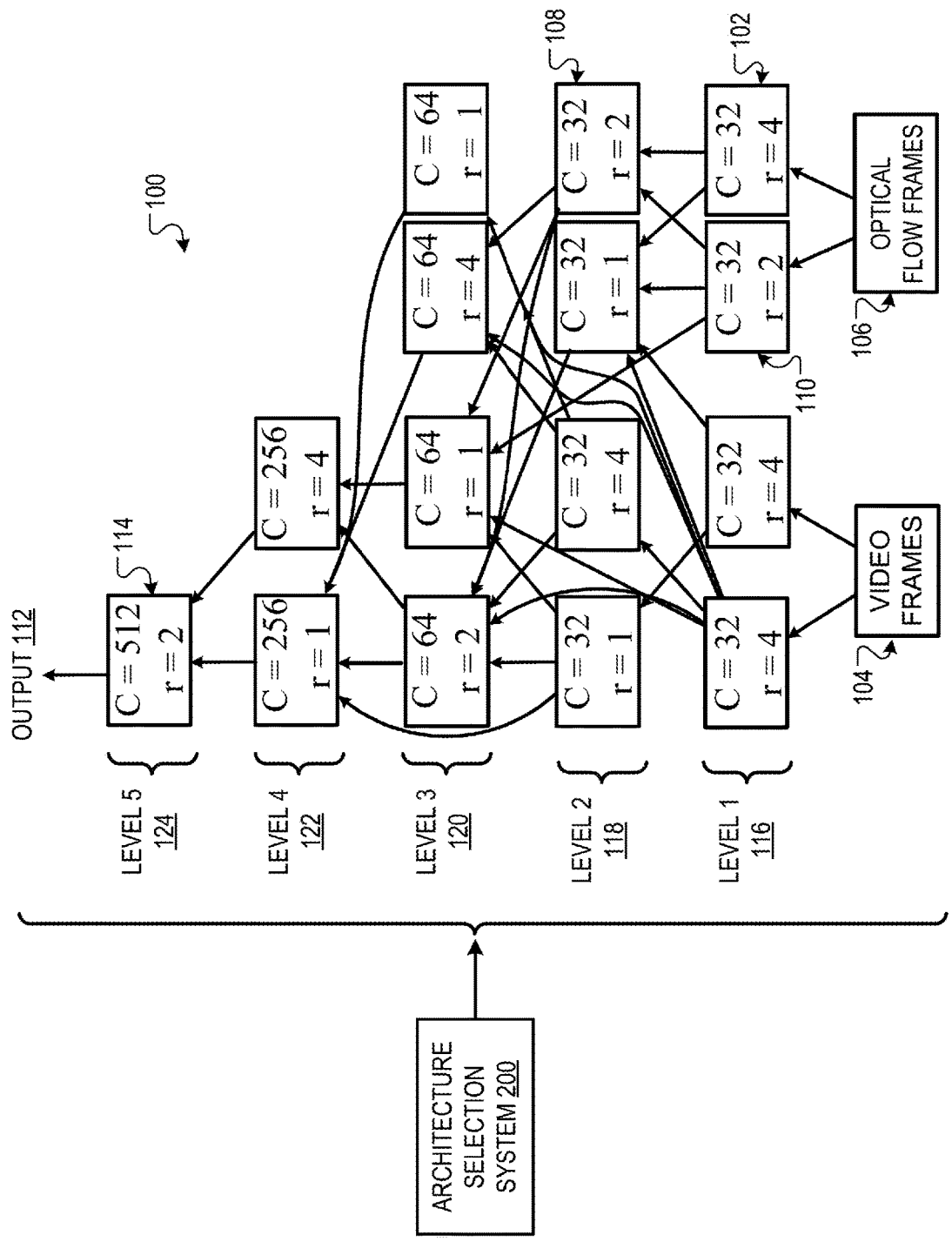
FIG. 1 shows an example of a possible neural network architecture for performing a video processing task that is generated by an architecture selection system.

The architecture selection system 200, which will be described in more detail with reference to FIG. 2, selects an architecture for the neural network from a space of possible architectures. An example architecture 100 that was selected by the architecture selection system 200 for a neural network configured to perform video processing tasks is illustrated in FIG. 1. Each possible architecture includes multiple "blocks," including one or more input blocks and one or more intermediate blocks. As used throughout this specification, a block refers to a group of neural network layers, e.g., that may be arranged in a sequence.

Each input block (e.g., the input block 102) may be configured to process the sequence of video frames (e.g., the video frames 104), the sequence of optical flow frames (e.g., the optical flow frames 106), or both. Each intermediate block may be configured to process an input that includes the outputs of one or more other blocks (e.g., the block 108 may be configured to receive inputs from the blocks 102 and 110). The neural network may generate an output (e.g., the output 112) by processing the outputs of one or more blocks of the neural network (e.g., the block 114) by one or more neural network layers, e.g., a sequence of layers including a pooling layer, a fully-connected layer, and a soft-max layer.

Each block may be a space-time convolutional block, i.e., a block that includes one or more convolutional neural network layers and that is configured to process a space-time input to generate a space-time output. Space-time data refers to an ordered collection of numerical values, e.g., a tensor of numerical values, which includes multiple spatial dimensions, a temporal dimension, and optionally, a channel dimension. Each block may generate an output having a respective number of channels, and in the neural network illustrated in FIG. 1, the number of channels in the output of each block is denoted by C, e.g., where the block 102 generates a block output with C=32 channels.

Each block may include, e.g., spatial convolutional layers (i.e., having convolutional kernels that are defined in the spatial dimensions), space-time convolutional layers (i.e., having convolutional kernels that are defined across the spatial and temporal dimensions), and temporal convolutional layers (i.e., having convolutional kernels that are defined in the temporal dimension).

The temporal convolutional layers may be "dilated" temporal convolutional layers, i.e., that generate a layer output by convolving the layer input with a kernel defined in the temporal dimension, where the convolution skips inputs (i.e., along the temporal dimension) according to a step size referred to as the dilation rate. A dilated temporal convolutional layer may be said to process a space-time input at a "temporal resolution" that is defined by the dilation rate, e.g., such that a higher dilation rate may correspond to a lower temporal resolution. In some cases, each temporal convolutional layer in a block may be configured to process space-time inputs at the same temporal resolution, which may be referred to as the temporal resolution of the block, and different blocks may have different temporal resolutions. In the neural network illustrated with reference to FIG. 1, the dilation rate of each block is denoted by r, e.g., where the block 102 has dilation rate r=4. The temporal resolution of a block may influence the nature of the information encoded in the output generated by the block, and blocks having different temporal resolutions may generate block outputs that encode complementary information, which may improve the performance of the neural network.

The spatial convolution layers may be "strided" convolutional layers, i.e., that generate a layer output by convolving the layer input with a kernel defined in the spatial dimension, where the convolutional window traverses the input (i.e., along the spatial dimension) according to a step size referred to as the stride.

In some implementations, the neural network layers in each block may be arranged into "residual modules". Each residual module includes one or more neural network layers, and the output of the residual module may be the sum of: (i) the input to the first layer of the residual module, and (ii) the output of the last layer of the residual module. Using residual modules may stabilize the training of the neural network, and thereby improve the performance of the trained neural network.

A given block that is configured to receive inputs from other blocks may maintain a respective "connection weight" parameter corresponding to each of these other blocks. The given block may combine the inputs from the other blocks in accordance with the connection weight parameters to generate a combined input, and then process the combined input (e.g., by one or more convolutional neural network layers) to generate a block output. The given block may generate the combined input $F^{in}$, e.g., as:

$$F^{in} = \sum_{i=1 \ldots n} \text{sigmoid}(w_i) \cdot F_i^{out} \qquad (1)$$

where i indexes the n other blocks that provide inputs to the given block, $w_i$ denotes the connection weight parameter corresponding block i, and $F_i^{out}$ denotes the input received from block i. Combining the inputs from the other blocks, e.g., in accordance with equation (1), may require the inputs from the other blocks to have the same spatial dimensionality and channel dimensionality. If the inputs from the other blocks have different spatial dimensionalities, the given block may apply pooling operations (e.g., max-pooling operations) to the inputs from the other blocks to cause their spatial dimensionalities to match. If the inputs from the other blocks have different channel dimensionalities, the given block may projection operations (e.g., implemented by spatial convolutional layers with 1×1-dimensional kernels) to cause their channel dimensionalities to match.

In some implementations, each block in the neural network may be associated with a respective level, e.g., the levels 116-124, and each block in a given level only receives inputs from blocks in lower levels. For example, each block in level 3 (120) may receive inputs from blocks in level 1 (116) and level 2 (118), but not level 3 (120), level 4 (122), or level 5 (124).

As part of selecting the architecture of a neural network, the architecture selection system may select: the number of blocks in each level of the architecture, the temporal resolution of each block, the number of channels in the output generated by each block, and which blocks receive inputs from which other blocks. To this end, the architecture selection system performs an automated search through the space of possible architectures to select an architecture that enables the neural network to effectively perform the machine learning task, as will be described in more detail with reference to FIG. 2.

While this specification primarily describes the architecture selection system as selecting a neural network architecture for performing a video processing task, more generally, the architecture selection system can be used to select a neural network architecture for performing any of a variety of neural network tasks. Examples of other neural network tasks include, e.g.: semantic segmentation tasks, image classification tasks, object detection tasks, action selection tasks, natural language processing tasks, and speech recognition tasks. Moreover, while this specification primarily describes the blocks as being space-time convolutional blocks, more generally, the blocks can include neural network layers of any appropriate type. Moreover, while this specification primarily describes selecting a neural network architecture that is configured to process video frames and/or optical flow frames, the architecture selection system can be used to select neural network architectures that process any appropriate type of data, e.g., data including a sequence of point clouds (e.g., generated by a Lidar sensor), and/or data including a sequence of hyperspectral images (e.g., generated by a hyper-spectral sensor).

Figure 2:
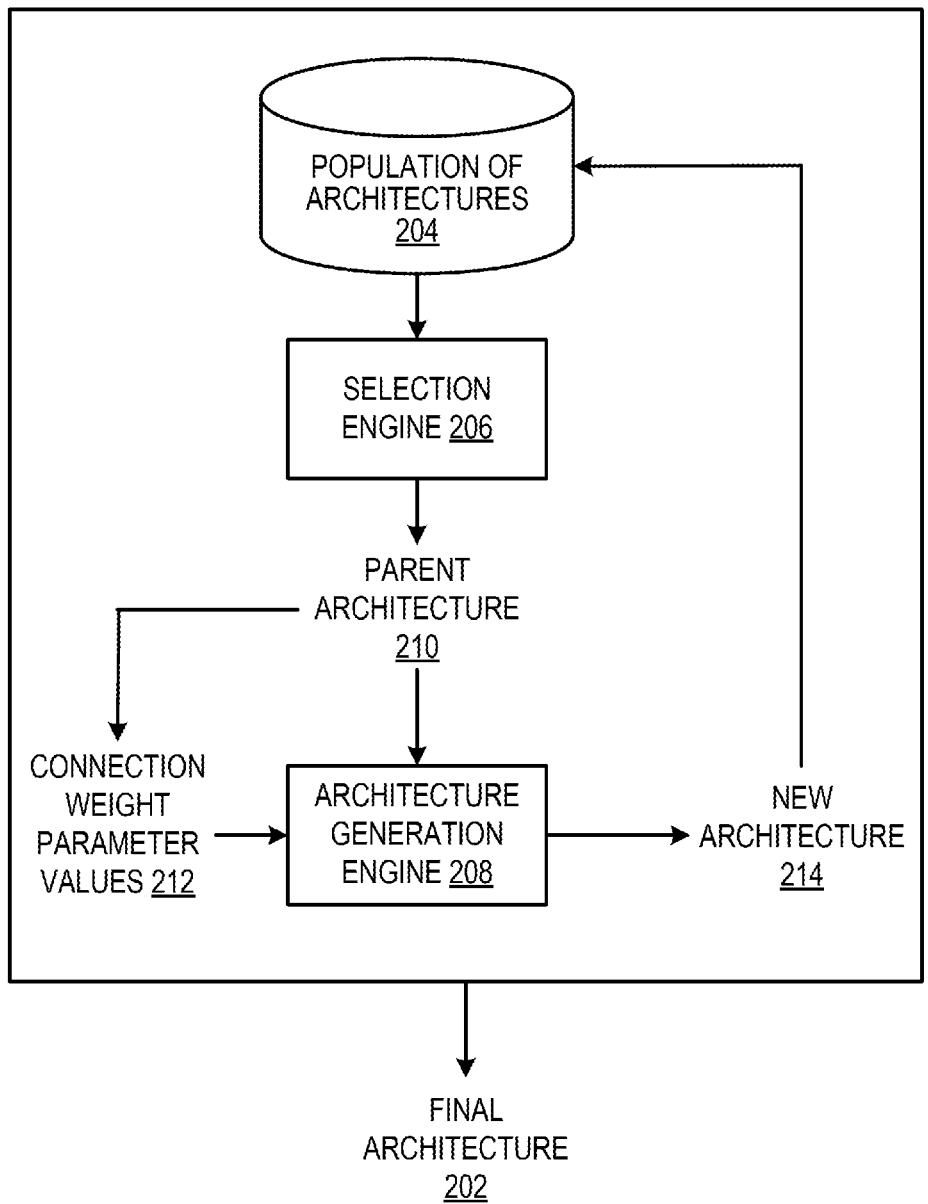
FIG. 2 shows an example architecture selection system.

FIG. 2 shows an example architecture selection system 200. The architecture selection system 200 is an example of a system implemented as computer programs on one or more computers in one or more locations in which the systems, components, and techniques described below are implemented.

The system 200 is configured to select a "final" neural network architecture 202 that enables a neural network having the architecture to effectively perform a machine learning task, e.g., a video processing task, as described above. To this end, the system 200 maintains a population (i.e., a set) of possible neural network architectures 204, and updates the population 204 at each of one or more iterations, which will be referred to herein as "evolutionary" iterations. In particular, the system 200 updates the population of architectures 204 to increase a likelihood that the population 204 includes architectures having superior (e.g., higher) performance metrics. The performance metric for an architecture may characterize a performance (e.g., a prediction accuracy) of a neural network having the architecture on the machine learning task. After a final evolutionary iteration, the system 200 may select an architecture from the population 204 as the final architecture 202, as will be described in more detail below.

The system 200 includes the population of possible architectures 204, a selection engine 206, and an architecture generation engine 208.

The population of possible architectures 204 includes multiple possible architectures and is maintained by the system 200 across evolutionary iterations. Each possible architecture may be, e.g., a video processing architecture that includes multiple space-time convolutional blocks, as described with reference to FIG. 1.

Prior to the first evolutionary iteration, the system 200 may initialize the population of architectures 204 by randomly generating a predefined number (e.g., 20, or any other appropriate number) of architectures, and adding the generated architectures to the population 204.

To randomly generate a possible architecture, the system 200 may initialize the architecture with a predefined number of blocks (e.g., 2 blocks, or any other appropriate number of blocks) at each of a predefined number of levels in the architecture (e.g., 5 levels, or any other appropriate number of levels). The architecture of each block (e.g., the number, type, and configuration of the neural network layers within the block) may be randomly selected from a predefined set of possible block architectures. Each possible block architecture may include dilated temporal convolutional neural network layers having a dilation rate from a set of possible dilation rates, e.g., $r \in \{1, 2, 4, 8\}$. Each possible block architecture may include strided convolutional neural network layers having a stride from a set of possible strides, e.g., $s \in \{1, 2, 4, 8\}$. Each possible block architecture may be configured to generate a block output having a number of channels from a set of possible channel dimensionalities, e.g., $C \in \{32, 64, 128, 256\}$.

After initializing the blocks at each level in the randomly generated neural network architecture, the system 200 may apply a random number of "splitting" or "merging" operations to randomly selected blocks in the architecture. Applying a splitting operation to a block may refer to replacing the block by two new blocks, e.g., where each new block may be configured to generate an output with only half as many channels as the original block, but have the same temporal resolution as the original block. Applying a merging operation to a pair of blocks may refer to replacing the pair of blocks by a single new block. The new block may be configured to generate an output with a number of channels equal to the sum of the respective number of channels in the output of each original block in the pair of blocks being merged. The temporal resolution of the new block may be randomly chosen from between the temporal resolution of each original block.

As part of randomly generating the possible architecture, the system 200 also determines which blocks should provide inputs to which other blocks, i.e., the system determines which blocks should be "connected". As used throughout this specification, a first block may be said to be connected to a second block if the second block is configured to receive an input from the first block. The system 200 may determine which blocks should be connected in the randomly generated architecture, e.g., by adding each possible connection to the architecture with a predefined probability, e.g., p=0.5. A connection between blocks is referred to as "possible" only if it specifies that a block at a higher level should receive an input from a block at a lower level.

At each evolutionary iteration, the selection engine 206 selects a "parent" neural network architecture from the population of architectures 204. To select the parent architecture 210, the selection engine 206 may randomly sample a predefined number of "candidate" architectures from the population of architectures 204, and determine a respective performance metric for each candidate architecture.

To determine the performance metric for a candidate architecture, the selection engine 206 may train a neural network having the candidate architecture to perform the machine learning task by training the neural network on a set of training data to determined trained values of the neural network parameters. In particular, the selection engine trains the neural network to determine trained values of the connection weight parameters corresponding to the connections between the blocks in the candidate architecture, as well as determining trained values of other neural network parameters, e.g., the parameters of the neural network layers within each block.

The set of training data may include multiple training examples, where each training example specifies: (i) a training input to the neural network, and (ii) a target output that should be generated by the neural network by processing the training input. For example, each training example may include a training input that specifies a sequence of video frames and/or a corresponding sequence of optical flow frames, and a target classification output, e.g., that indicates an action being performed by a person depicted in the video frames. The selection engine 206 may train the neural network using any appropriate machine learning training technique, e.g., stochastic gradient descent, where gradients of an objective function are backpropagated through the neural network at each of one or more training iterations. The objective function may be, e.g., a cross-entropy objective function, or any other appropriate objective function.

It will be appreciated that the neural network may be trained for video processing tasks other than classification tasks by a suitable selection of training data and/or loss function. For example, the neural network can be trained for super resolution (in the spatial and/or temporal domain) using a training set comprising down-sampled videos and corresponding higher-resolution ground-truth videos, with a loss function that compares output of the neural network to a higher-resolution ground-truth video corresponding to the down-sampled video input to the neural network, e.g. an L1 or L2 loss. As a further example, the neural network can be trained to remove one or more types of image/video artefact from videos, such as blocking artefacts that may be introduced during video encoding. In this example, the training dataset may comprise a set of ground truth videos, each with one or more corresponding "degraded" videos (i.e. with one or more types of artefact introduced), with a loss function that compares output of the neural network to a the ground-truth video corresponding to the degraded video input to the neural network, e.g. an L1 or L2 loss.

After training a neural network having the candidate architecture on the set of training data, the selection engine 206 may determine the performance metric for the candidate architecture by evaluating the performance of the trained neural network on a set of validation data. The validation data may also include multiple training examples, as described above, but is generally separate from the training data, i.e., such that the neural network is not trained on the validation data. The selection engine 206 may evaluate the performance of the trained neural network on the set of validation data using an objective function that measures the prediction accuracy of the trained neural network, e.g., a cross-entropy objective function. The selection engine 206 may determine the performance metric for the candidate architecture, e.g., as an average of the value of the objective function across the set of validation data when the training inputs of the validation data are processed using the trained neural network having the candidate architecture.

The selection engine 206 may identify the parent architecture 210 for the current evolutionary iteration based on the performance metrics for the candidate architectures selected from the population of architectures 204 at the current evolutionary iteration. For example, the selection engine 206 may identify the candidate architecture having the "best" (e.g., highest) performance metric as the parent architecture 210 for the current evolutionary iteration. Moreover, the selection engine 206 may also remove one or more of the candidate architectures from the population of architectures 204. For example, the selection engine 206 may remove the candidate architecture having the "worst" (e.g., lowest) performance metric from the population of architectures 204.

In some cases, some or all of the candidate architectures may have been trained to perform the machine learning task at previous evolutionary iterations, and the architecture selection system 200 may have stored the previously generated performance metrics for these architectures. In these cases, the selection engine 206 may reuse the previously generated performance metrics for these architectures, rather than generating them again at each evolutionary iteration.

At each evolutionary iteration, the architecture generation engine 208 is configured to generate a "new" neural network architecture based on both: (i) the parent architecture 210, and (ii) the trained values of the connection weight parameters 212 of the parent architecture 210. In particular, the architecture generation engine 208 determines which blocks in the new architecture should be connected (i.e., which blocks should receive inputs from which other blocks) based at least in part on the trained values of the connection weight parameters 212 of the parent architecture 210.

For example, the architecture generation engine 208 may initialize the new architecture 214 by generating a copy of the parent architecture 210 and setting the new architecture 214 equal to the copy of the parent architecture 210. The architecture generation engine 208 may then modify the connections between the blocks of the new architecture 214 based on the connection weight parameter values 212 of the parent architecture 210. For example, the architecture generation engine 208 may prune (remove) each connection from the new architecture 214 that corresponds to a connection weight parameter value 212 that is below a threshold value. That is, the architecture generation engine 208 may maintain only the connections in the new architecture 214 that correspond to connection weight parameter values 212 that exceed a threshold value, while removing the other connections. The threshold value may be a predefined threshold value (e.g., 0.5), or a threshold value that is dynamically determined for each connection by sampling from a predefined probability distribution, e.g., a uniform probability distribution over the interval [0,1].

The architecture generation engine 208 may also add new connections to the new architecture 214. For example, for each possible connection that is not included in the parent architecture 210, the architecture generation engine 208 may add the possible connection to the new architecture with a predefined probability. The predefined probability may be a ratio of: (i) the number of connections that were pruned from the new architecture, and (ii) the number of possible edges that were not included in the parent architecture 210. Adding new connections to the new architecture 214 with this probability may result in the new architecture 214 having, on average, the same total number of connections as the parent architecture 210.

After modifying the connections between the blocks of the new architecture 214, the architecture generation engine 208 may apply one or more "mutation" operations to randomly selected blocks of the new architecture 214. The mutation operations may include, e.g.: block splitting operations, block merging operations, and operations to change the dilation rate of temporal convolutional layers in blocks. In applying a splitting operation to a block to generate two new blocks, the architecture generation engine 208 may determine that each new block has the same connections as the original block. That is, each new block may be configured to receive inputs from the same source(s) as the original block, and provide its output to the same destination(s) as the original block. In applying a merging operation to a pair of blocks, the architecture generation engine 208 may determine that the new block has all the connections of both the original blocks. That is, the new block may be configured to receive inputs from the same source(s) as each original block, and provide its output to the same destination(s) as each original block. The architecture generation engine 208 may change the dilation rate of the temporal convolutional layers in a block, e.g., by randomly sampling a new dilation rate for the temporal convolutional layers in the block from a set of possible temporal dilation rates.

The system 200 may add the new architecture 214 generated by the architecture generation engine 208 to the population of architectures 204, and then proceed to the next evolutionary iteration.

Generating the new architectures 214 based on the learned connection weight parameter values 212 of the parent architectures 210 may enable the system 200 to generate new architectures 214 that maintain some of the properties which make the parent architecture 210 effective at performing the machine learning task. Simultaneously, new connections are randomly added to the new architectures 214, thereby enabling the system 200 to explore variations of the parent architectures 210 that may be more effective at performing the machine learning task. Guiding the evolution of the population of architectures based on trained values of connection weight parameters may increase the likelihood of the system generating new architectures 214 having superior (e.g., higher) performance metrics.

After a final evolutionary iteration, the system 200 may select one or more of the architectures from the population of architectures 204 as final architectures 202. For example, the system 200 may identify the final architecture 202 as being the architecture with the best (e.g., highest) performance metric from among the population of architectures 204. As another example, the system 200 may identify a predefined number of architectures with the best performance metrics from among the population of architectures 204 as the final architectures.

The final architecture(s) 202 can be used in any of a variety of ways. For example, a neural network having the final architecture 202 may be deployed to perform the machine learning task. As another example, the final architecture(s) 202 may be used to initialize a subsequent architecture refinement procedure, e.g., that modifies the final architecture(s) 202 to determine other architecture(s) for performing the machine learning task. As another example, multiple final architectures may be combined to form an ensemble model for performing the machine learning task, e.g., such that the output of each final architecture is combined (e.g., averaged) to determine an ensemble output.

Figure 3:
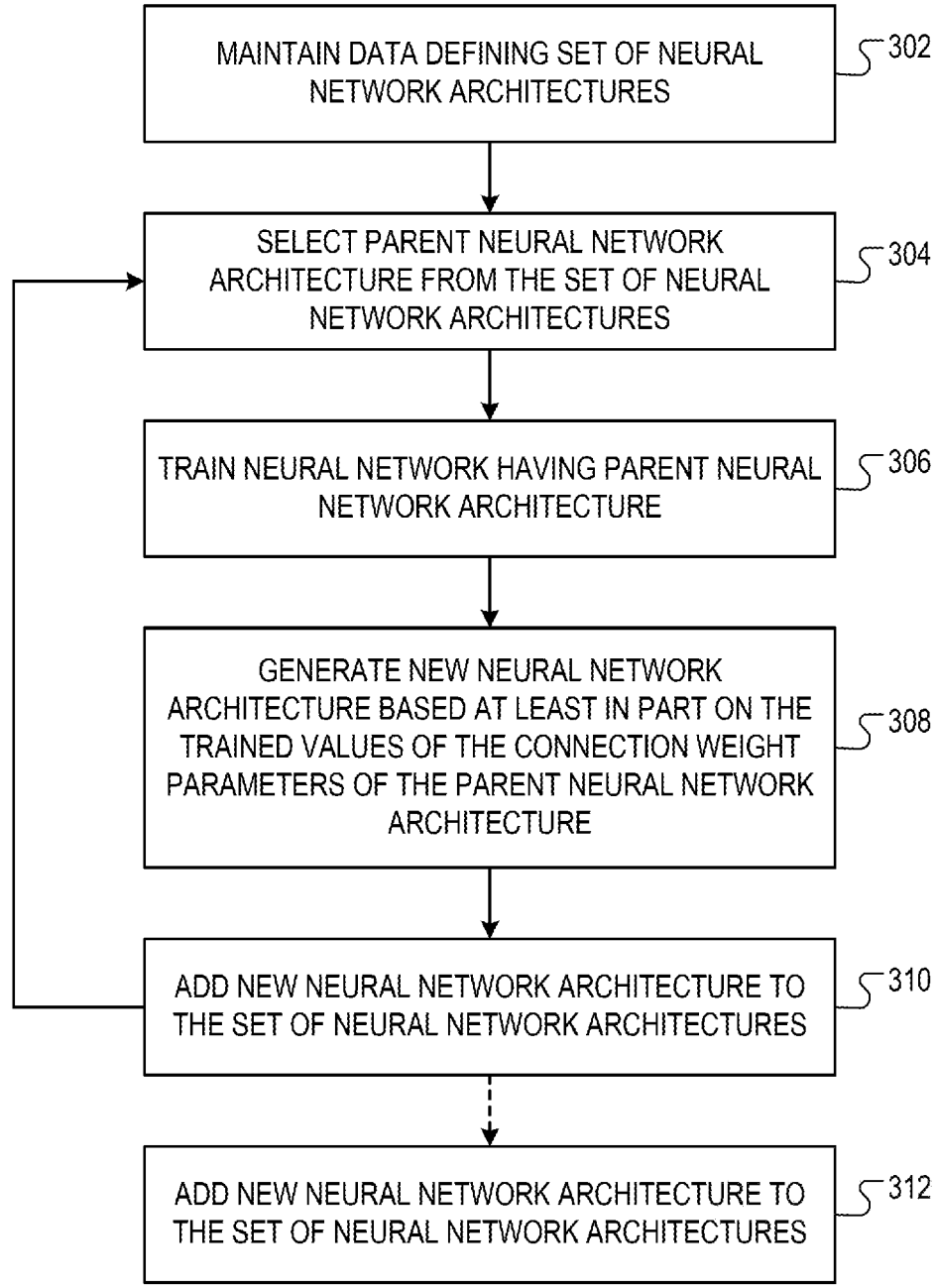
FIG. 3 is a flow diagram of an example process for determining a neural network architecture of a neural network for performing a video processing neural network task.

FIG. 3 is a flow diagram of an example process 300 for determining a neural network architecture of a neural network for performing a video processing neural network task. For convenience, the process 300 will be described as being performed by a system of one or more computers located in one or more locations. For example, an architecture selection system, e.g., the architecture selection system 200 of FIG. 2, appropriately programmed in accordance with this specification, can perform the process 300.

The system maintains data defining a set of neural network architectures (302). Each neural network architecture includes multiple of blocks, where each block is a space-time convolutional block including one or more neural network layers that is configured to process a block input to generate a block output. For each of one or more given blocks: (i) the block input for the given block includes a block output from each of one or more other blocks, (ii) the given block has a respective connection weight parameter corresponding to each of the one or more other blocks, and (iii) processing the block input includes combining the other block outputs using the connection weight parameters corresponding to the other blocks.

The system performs steps 304-310 at each of one or more evolutionary iterations.

The system selects a parent neural network architecture from the set of neural network architectures (304).

The system trains a neural network having the parent neural network architecture to perform the video processing neural network task, including determining trained values of the connection weight parameters of the parent neural network architecture (306).

The system generates a new neural network architecture based at least in part on the trained values of the connection weight parameters of the parent neural network architecture (308).

The system adds the new neural network architecture to the set of neural network architectures (310).

If the current evolutionary iteration is not the final evolutionary iteration, the system returns to step 304. If the current evolutionary iteration is the final evolutionary iteration, the system selects a final neural network architecture from the set of neural network architectures based on a performance metric for the final neural network architecture on the video processing neural network task (312).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for determining a neural network architecture of a neural network for performing a video processing neural network task, the method comprising:
maintaining data defining a set of neural network architectures, wherein for each neural network architecture:
the neural network architecture comprises a plurality of blocks, wherein each block is a space-time convolutional block comprising one or more neural network layers that is configured to process a block input to generate a block output; and
for each of one or more given blocks: (i) the block input for the given block comprises a block output from each of a plurality of other blocks, (ii) the given block has a respective connection weight parameter corresponding to each of the plurality of other blocks, and (iii) processing the block input comprises combining the other block outputs using the connection weight parameters corresponding to the other blocks;
at each of a plurality of iterations:
selecting a parent neural network architecture from the set of neural network architectures;
training a neural network having the parent neural network architecture to perform the video processing neural network task, comprising determining trained values of the connection weight parameters of the parent neural network architecture;
generating a new neural network architecture based at least in part on the trained values of the connection weight parameters of the parent neural network architecture; and
adding the new neural network architecture to the set of neural network architectures; and
after a final iteration of the plurality of iterations, selecting a final neural network architecture from the set of neural network architectures based on a performance metric for the final neural network architecture on the video processing neural network task.

2. The method of claim 1, wherein each neural network architecture is configured to process an input comprising (i) a plurality of video frames, and/or (ii) a plurality of optical flow frames corresponding to the plurality of video frames.

3. The method of claim 1, wherein each block processes a block input at a respective temporal resolution to generate a block output having a respective number of channels.

4. The method of claim 3, wherein each block comprises one or more dilated temporal convolutional layers having a temporal dilation rate corresponding to the temporal resolution of the block.

5. The method of claim 3, wherein each neural network architecture comprises blocks having different temporal resolutions.

6. The method of claim 1, wherein each block comprises one or more residual modules.

7. The method of claim 1, wherein combining the other block outputs using the connection weight parameters corresponding to the other blocks comprises:
for each other block output, scaling the other block output by the connection weight parameter corresponding to the other block; and
generating a combined input by summing the scaled other block outputs.

8. The method of claim 7, wherein processing the block input further comprises:
processing the combined input in accordance with a plurality of block parameters to generate the block output.

9. The method of claim 1, wherein generating a new neural network architecture based at least in part on the trained values of the connection weight parameters of the parent neural network architecture comprises:
determining which blocks in the new neural network architecture should receive block outputs from which other blocks in the new neural network architecture based at least in part on the trained values of the connection weight parameters of the parent neural network architecture.

10. The method of claim 9, wherein determining which blocks in the new neural network architecture should receive block outputs from which other blocks in the new neural network architecture based at least in part on the trained values of the connection weight parameters of the parent neural network architecture comprises:
determining, for each given block in the parent neural network architecture that (i) receives a block output from an other block and (ii) has a connection weight parameter corresponding to the other block having a trained value that exceeds a threshold, that a block in the new neural network architecture corresponding to the given block should receive a block output from a block in the new neural network architecture corresponding to the other block.

11. The method of claim 10, wherein the threshold is a predetermined threshold.

12. The method of claim 10, wherein the threshold is sampled in accordance with a predetermined probability distribution.

13. The method of claim 9, further comprising:
for each of one or more pairs of blocks in the new neural network architecture comprising a first block and a second block, randomly determining whether the second block should receive a block output from the first block.

14. The method of claim 1, wherein generating the new neural network architecture comprises:
for each of one or more blocks in the new neural network architecture that correspond to respective blocks in the parent neural network architecture, applying one or more mutation operations to the block, wherein the mutation operations comprise: splitting the block, merging the block with a different block, and adjusting a temporal resolution of the block.

15. The method of claim 1, wherein selecting a parent neural network architecture from the set of neural network architectures comprises:
determining, for each of a plurality of particular neural network architectures from the set of neural network architectures, a performance metric of a neural network having the particular neural network architecture that is trained to perform the video processing neural network task; and
selecting the parent neural network architecture from among the plurality of particular neural network architectures based on the performance metrics.

16. The method of claim 15, wherein selecting the parent neural network architecture from among the plurality of particular neural network architectures based on the performance metrics comprises:
selecting the parent neural network architecture as the particular neural network architecture having the highest performance metric on the video processing neural network task.

17. The method of claim 15, further comprising:
removing the particular neural network architecture having the lowest performance measure on the video processing neural network task from the set of neural network architectures.

18. The method of claim 1, wherein selecting the final neural network architecture from the set of neural network architectures comprises:
determining, for each neural network architecture from the set of neural network architectures, a performance metric of a neural network having the neural network architecture that is trained to perform the video processing neural network task; and
selecting the final neural network architecture as the neural network architecture having the highest performance metric on the video processing neural network task.

19. A system comprising one or more computers and one or more storage devices storing instructions that when executed by the one or more computers cause the one or more computers to perform operations for determining a neural network architecture of a neural network for performing a video processing neural network task, the operations comprising:
maintaining data defining a set of neural network architectures, wherein for each neural network architecture:
the neural network architecture comprises a plurality of blocks, wherein each block is a space-time convolutional block comprising one or more neural network layers that is configured to process a block input to generate a block output; and
for each of one or more given blocks: (i) the block input for the given block comprises a block output from each of a plurality of other blocks, (ii) the given block has a respective connection weight parameter corresponding to each of the plurality of other blocks, and (iii) processing the block input comprises combining the other block outputs using the connection weight parameters corresponding to the other blocks;
at each of a plurality of iterations:
selecting a parent neural network architecture from the set of neural network architectures;
training a neural network having the parent neural network architecture to perform the video processing neural network task, comprising determining trained values of the connection weight parameters of the parent neural network architecture;
generating a new neural network architecture based at least in part on the trained values of the connection weight parameters of the parent neural network architecture; and
adding the new neural network architecture to the set of neural network architectures; and
after a final iteration of the plurality of iterations, selecting a final neural network architecture from the set of neural network architectures based on a performance metric for the final neural network architecture on the video processing neural network task.

20. One or more non-transitory computer storage media storing instructions that when executed by one or more computers cause the one or more computers to perform operations for determining a neural network architecture of a neural network for performing a video processing neural network task, the operations comprising:
maintaining data defining a set of neural network architectures, wherein for each neural network architecture:
the neural network architecture comprises a plurality of blocks, wherein each block is a space-time convolutional block comprising one or more neural network layers that is configured to process a block input to generate a block output; and
for each of one or more given blocks: (i) the block input for the given block comprises a block output from each of a plurality of other blocks, (ii) the given block has a respective connection weight parameter corresponding to each of the plurality of other blocks, and (iii) processing the block input comprises combining the other block outputs using the connection weight parameters corresponding to the other blocks;
at each of a plurality of iterations:
selecting a parent neural network architecture from the set of neural network architectures;
training a neural network having the parent neural network architecture to perform the video processing neural network task, comprising determining trained values of the connection weight parameters of the parent neural network architecture;

generating a new neural network architecture based at least in part on the trained values of the connection weight parameters of the parent neural network architecture; and adding the new neural network architecture to the set of neural network architectures; and after a final iteration of the plurality of iterations, selecting a final neural network architecture from the set of neural network architectures based on a performance metric for the final neural network architecture on the video processing neural network task.

\* \* \* \* \*